(12) United States Patent
Chen et al.

(10) Patent No.: US 9,428,385 B2
(45) Date of Patent: Aug. 30, 2016

(54) EXHAUST GAS EXPANSION TANK AND OZONE GENERATOR SYSTEM APPLYING THE SAME

(71) Applicant: Fujian Newland Entech Co., Ltd., Fuzhou (CN)

(72) Inventors: Jian Chen, Fuzhou (CN); Xiaozhen Yang, Fuzhou (CN); Xiangyang Yao, Fuzhou (CN); Meiyan Wang, Fuzhou (CN)

(73) Assignee: Fujian Newland Entech Co., Ltd., Fuzhou (CN)

( * ) Notice: Subject to any disclaimer, the term of this patent is extended or adjusted under 35 U.S.C. 154(b) by 0 days.

(21) Appl. No.: 14/162,099

(22) Filed: Jan. 23, 2014

(65) Prior Publication Data

US 2014/0205510 A1    Jul. 24, 2014

(30) Foreign Application Priority Data

Jan. 24, 2013  (CN) .......................... 2013 1 0024822
Jan. 24, 2013  (CN) ...................... 2013 2 0035431 U

(51) Int. Cl.
*F16K 24/04*  (2006.01)
*C01B 13/10*  (2006.01)

(52) U.S. Cl.
CPC ........... *C01B 13/10* (2013.01); *C01B 2201/76* (2013.01); *Y10T 137/3084* (2015.04)

(58) Field of Classification Search
CPC .... C01B 13/10; C01B 2201/76; F16K 24/04
See application file for complete search history.

(56) References Cited

U.S. PATENT DOCUMENTS 4,625,753 A * 12/1986 Gustafson ..................... 137/202
5,165,246 A * 11/1992 Cipolla et al. ................. 62/47.1
5,431,861 A *  7/1995 Nagahiro et al. .......... 261/140.1

* cited by examiner

*Primary Examiner* — Kishor Mayekar
(74) *Attorney, Agent, or Firm* — The Webb Law Firm

(57) ABSTRACT

The present invention relates to an exhaust gas expansion tank and an ozone generator system applying the same. The exhaust gas expansion tank includes a tank body and an automatic exhaust valve, and is provided at the top thereof with a gas outlet conduit, the lower end of the gas outlet conduit extending into the tank body and being at a distance from the bottom of the tank body, the automatic exhaust valve fixedly mounted on the upper end of the gas outlet conduit, and the tank body having a first water port and a second water port. The ozone generator system applying the exhaust gas expansion tank is simplified in system structure, can evacuate gas automatically and omit the manual exhausting of gas, thereby the operation procedure is simplified, the thermal expansion of the system is effectively controlled and the stability of the system operation is increased.

4 Claims, 2 Drawing Sheets

EXHAUST GAS EXPANSION TANK AND OZONE GENERATOR SYSTEM APPLYING THE SAME

CROSS-REFERENCE TO RELATED APPLICATIONS

This application claims priority to Chinese Patent Application Nos. 201310024822.9 and 201320035431.2, both filed Jan. 24, 2013, the disclosures of which are hereby incorporated in their entirety by reference.

BACKGROUND OF THE INVENTION

1. Field of the Invention

The present invention relates to the field of ozone generator system, in particular to an exhaust gas expansion tank and an ozone generator system applying the same.

2. Description of Related Art

The ozone used in industry is usually generated by large ozone generator, which releases a lot of thermal energy in operation, thus cooling procedure is necessary in the meantime. Otherwise, the ozone will decompose during the generation thereof due to the high temperature, which affects the efficiency of the ozone generator. Water cooling ozone generator is excellent in cooling effect, leads to no ozone loss and can continue working stably for a long time, therefore the large ozone generator are usually of water-cooling type.

The current closed cooling procedure uses distilled water as the cooling medium, which circulates in a closed loop consisting of the ozone generator, a circulation pump and a plate heat exchanger. The cooling water at lower temperature is supplied to the plate heat exchanger to cool the distilled water at higher temperature circulating therein. However, in summer the cooling water is at a relatively higher temperature, which causes the cooling water in the circulating system to expand in volume and the internal pressure in the system to be increased. A commonly-used solution lies in increasing expansion balls made of elastic material between the ozone generator and the plate heat exchanger, so as to absorb the gas during the circulation procedure, and then manually control the exhausting of the gas in the expansion balls. This arrangement more or less addresses the pressure problem in the system, however, it makes the system structure complicated, increases operation steps and requires manual exhausting of gas to control the gas pressure in the expansion balls. Thus the exhausting effect is manually affected and is not stable. When frequent exhausting of gas is needed, it requires lots of manual work. Moreover, in winter the cooling water shrinks in volume and no cooling water can be supplemented to the ozone generator. In this case, it requires manually supplementing the cooling water and performing the exhausting of gas, which increases the workload and difficulty. Therefore, there is need an exhaust gas expansion tank which is simpler and more efficient so as to address the thermal expansion of the system.

SUMMARY OF THE INVENTION

A first objective of the present invention is to provide an exhaust gas expansion tank which is simpler and more efficient.

A solution to achieve the first objective of the present invention lies in an exhaust gas expansion tank, which comprises a tank body and an automatic exhaust valve, wherein the exhaust gas expansion tank is provided at the top thereof with a gas outlet conduit, the lower end of the gas outlet conduit extending into the tank body and being at a distance from the bottom of the tank body, the automatic exhaust valve is fixedly mounted on the upper end of the gas outlet conduit, and the tank body is provided thereon with a first water port and a second water port.

Further, the tank body may be provided thereon with a supplementary water port.

A second objective of the present invention is to provide an ozone generator system which applying the exhaust gas expansion tank according to the first objective of the present invention, wherein said ozone generator system is capable of automatically adjusting the internal pressure in the system, is simple in structure and stable in operation.

A solution to achieve the second objective of the present invention lies in an ozone generator system which comprises an internal circulation loop consisting of an ozone generator, a circulation pump and a heat exchanger, wherein the exhaust gas expansion tank is mounted between the ozone generator and the circulation pump, and the first water port and the second water port on the tank body are respectively communicated with the ozone generator and the circulation pump via a conduit.

Further, the internal circulation loop may comprise a supplementary water reservoir.

Further, the supplementary water reservoir is connected to the ozone generator or the exhaust gas expansion tank via a conduit.

The expansion tank and ozone generator system applying the same according to the present invention can bring about the following advantages:

1) The gas outlet conduit extending into the tank body is connected with the automatic exhaust valve, thus the gas generated during the internal circulation process is pressed into the exhaust gas expansion tank and then is evacuated via the automatic exhaust valve.

2) The tank body of the exhaust gas expansion tank provides the expanded internal cooling water of the ozone generator with storing space.

3) Cooling water may be automatically supplemented into the ozone generator or surplus cooling water may be automatically evacuated into the exhaust gas expansion tank according to the amount of cooling water in the ozone generator. When the cooling water in the ozone generator increases in volume, surplus cooling water will flow into the exhaust gas expansion tank via the first water port. When the cooling water supplied into the exhaust gas expansion tank submerges the lower end port of the gas outlet conduit, the gas inside the tank body cannot be evacuated via the conduit, thus making the pressure in the exhaust gas expansion tank increase. Under these normal operation circumstances, water within the tank may submerge the lower end of the gas outlet conduit, thereby creating a water seal over the gas outlet conduit which prevents gas from being evacuated via the gas outlet conduit while still allowing water within the tank to automatically flow in/flow out of the tank through the first and/or second water port. When the cooling water in the ozone generator shrinks in volume, it is necessary to supplement cooling water, at this time, the pressure in the ozone generator is reduced, causing the pressure in the exhaust gas expansion tank to be higher than that in the ozone generator, thus the cooling water in the exhaust gas expansion tank automatically flows into the ozone generator under the effect of pressure, thereby achieving automatic supplementation of water to the ozone generator.

4) The cooling water in the ozone generator can be adjusted automatically and the gas exhaustion can be performed automatically, which simplifies the operation procedure and makes the system operation more stable.

5) No manual exhausting of gas is needed, which significantly reduces the workload during the installation, debugging and operation and meanwhile increases the security and stability of the system.

The arrow in the figures represents the direction of water flow.

DESCRIPTION OF THE INVENTION

The invention will be further described in the following with reference to the figures.

Embodiment 1

Figure 1:
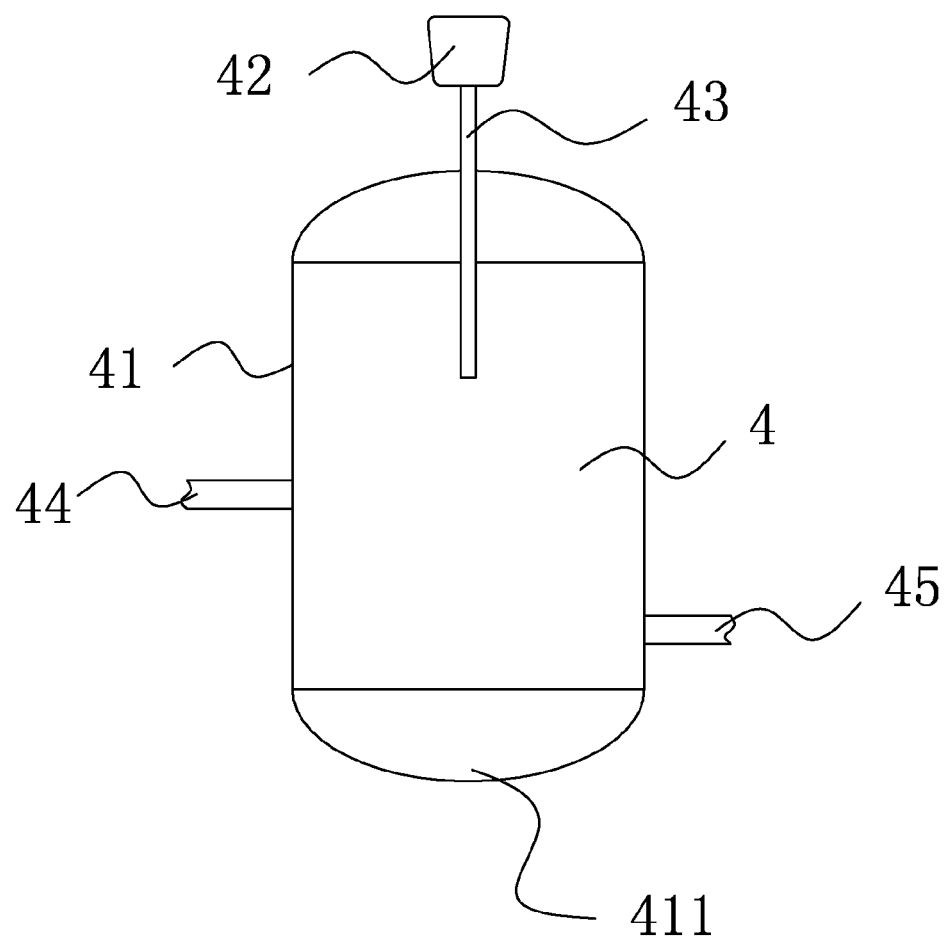
FIG. 1 is a sectional view of the exhaust gas expansion tank according to the invention.

As shown in FIG. 1, an exhaust gas expansion tank 4 comprises a tank body 41 and an automatic exhaust valve 42, the exhaust gas expansion tank is provided at the top thereof with a gas outlet conduit 43, with the lower end of the gas outlet conduit extending into the tank body and being at a distance from the bottom 411 of the tank body. The automatic exhaust valve 42 is fixedly mounted on the upper end of the gas outlet conduit 43, and the tank body 41 is provided thereon with a first water port 44 and a second water port 45. When necessary, the tank body may be provided thereon with a supplementary water port.

Embodiment 2

Figure 2:
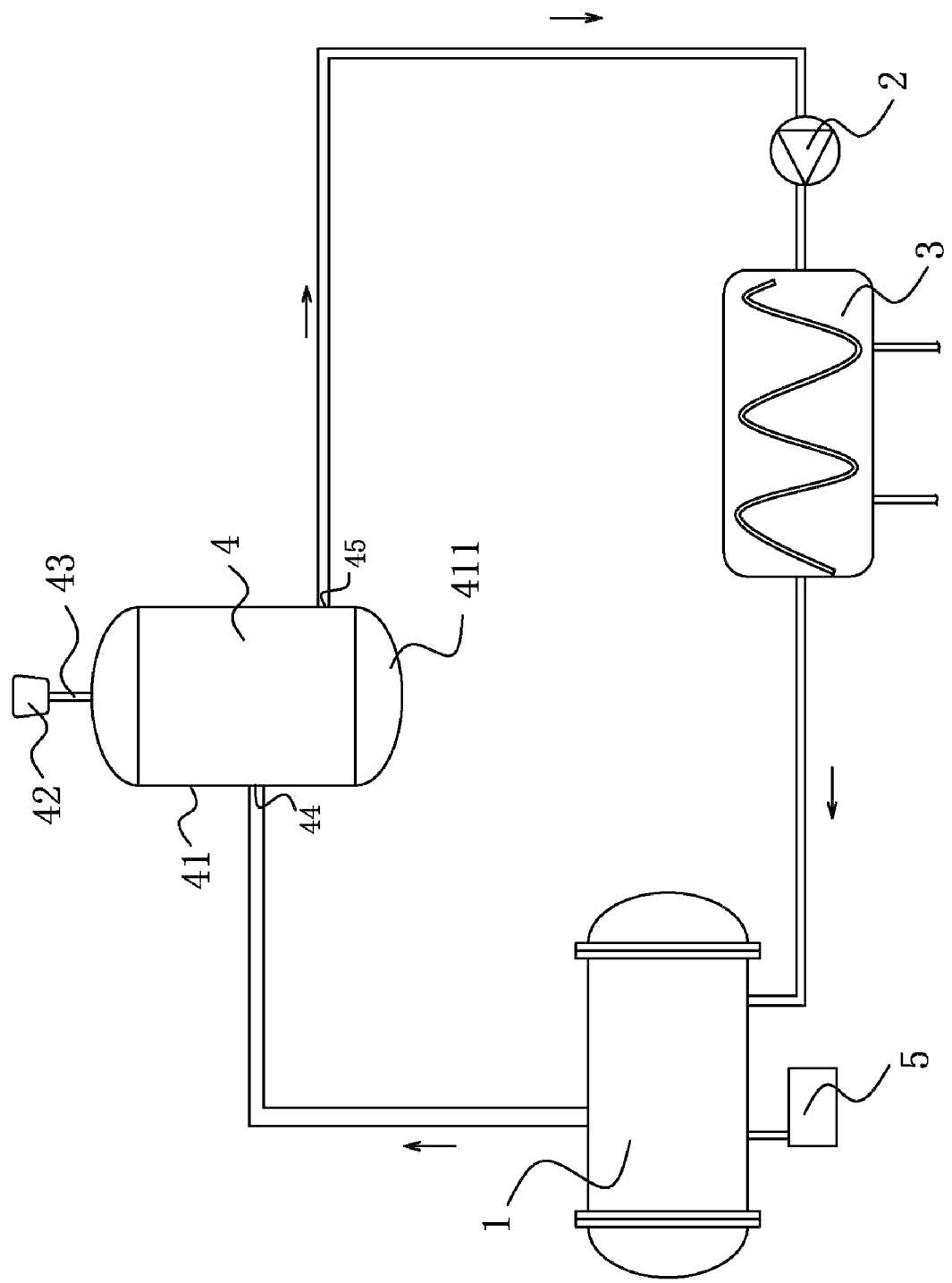
FIG. 2 is a schematic structural view of the ozone generator system according to the invention.

As shown in FIG. 2, an ozone generator system comprises an internal circulation loop consisting of an ozone generator 1, a circulation pump 2 and a plate heat exchanger 3, and further comprises an exhaust gas expansion tank 4 which is mounted between the ozone generator 1 and the circulation pump 2. The exhaust gas expansion tank 4 comprises a tank body 41 and an automatic exhaust valve 42, the exhaust gas expansion tank is provided at the top thereof with a gas outlet conduit 43, with the lower end of the gas outlet conduit 43 extending into the tank body and being at a distance from the bottom 411 of the tank body. The automatic exhaust valve 42 is fixedly mounted on the upper end of the gas outlet conduit 43, and the tank body is provided thereon with a first water port and a second water port, which are respectively communicated with the ozone generator and the circulation pump via a conduit. The internal circulation loop further comprises a supplementary water reservoir 5, which is connected to the ozone generator via a conduit.

The exhaust gas expansion tank according to the present invention is provided with a gas outlet conduit extending into the tank body and an automatic exhaust valve, thus the gas generated during the internal circulation of the cooling water in the system flows into the exhaust gas expansion tank, and part of the gas is evacuated via the gas outlet conduit and the automatic exhaust valve. When the cooling water in the ozone generator increases in volume due to various factors, surplus cooling water will flow into the exhaust gas expansion tank via the first water port, and the exhaust gas expansion tank provides the expanded cooling water in the ozone generator with storing space. When the cooling water supplied into the exhaust gas expansion tank submerges the lower end port of the gas outlet conduit, a water seal is created over the gas outlet conduit and the gas above the liquid level inside the tank body cannot be evacuated via the gas outlet conduit and will stay in the space above the liquid level, thus making the pressure in the exhaust gas expansion tank increase. When the cooling water in the ozone generator shrinks in volume due to various factors, it is necessary to supplement cooling water into the ozone generator, at this time, the pressure in the ozone generator is reduced due to the shrink of the volume of the cooling water, causing the pressure in the exhaust gas expansion tank to be higher than that in the ozone generator, thus the cooling water in the exhaust gas expansion tank will automatically flow back into the ozone generator through the first water port under the effect of pressure difference, thereby achieving automatic supplementation of water to the ozone generator. Therefore, the amount of the cooling water in the ozone generator can be adjusted automatically and the gas exhaustion can be performed automatically, which simplifies the operation procedure and makes the system operation more stable and safe. Meanwhile, the problem caused by thermal expansion and cool contraction of the cooling water as well as the problem relating to the exhausting of gas by the conduit during the system operation are addressed, and the workload and manual influence are significantly reduced as well.

The exhaust gas expansion tank according to the invention may be not only applied in an ozone generator system, but also applied in other systems in which the water volume expansion problem needs to be addressed.

The invention claimed is:

1. An ozone generator system comprising an exhaust gas expansion tank and an internal circulation loop, wherein the expansion tank comprises a tank body and an automatic exhaust valve, said exhaust gas expansion tank provided at the top thereof with a gas outlet conduit, the lower end of the gas outlet conduit extending into the tank body and being at a distance from a bottom of the tank body, the automatic exhaust valve fixedly mounted on the upper end of the gas outlet conduit, and the tank body provided thereon with a first water port and a second water port wherein during normal operation, the tank further comprises water to a level above the lower end of the gas outlet conduit such that water within the tank submerges the lower end of the gas outlet conduit, thereby creating a water seal over the gas outlet conduit which prevents gas from being evacuated via the gas outlet conduit, while still allowing water within the tank to automatically flow in/flow out of the tank through the first and/or second water port, wherein the internal circulation loop comprises an ozone generator, a circulation pump and a heat exchanger, wherein the exhaust gas expansion tank is mounted between the ozone generator and the circulation pump, and wherein the first water port and the second water port on the tank body are respectively communicated with the ozone generator and the circulation pump via a first conduit.

2. The ozone generator system according to claim 1, wherein the tank body is provided thereon with a supplementary water port.

3. The ozone generator system according to claim 1, wherein the internal circulation loop further comprises a supplementary water reservoir.

4. The ozone generator system according to claim 3, wherein the supplementary water reservoir is connected to the ozone generator or the exhaust gas expansion tank via a second conduit.

\* \* \* \* \*